United States Patent [19]

Benarroch

[11] Patent Number: 5,367,785

[45] Date of Patent: Nov. 29, 1994

[54] LOCKING AND MEASURING DEVICE

[76] Inventor: Isaac Benarroch, 1800 NE. 114 St., Suite #2004, Miami, Fla. 33181

[21] Appl. No.: 199,844

[22] Filed: Feb. 22, 1994

[51] Int. Cl.$^5$ .......................... G01B 3/10; E05B 73/00
[52] U.S. Cl. ........................................ 33/767; 33/760; 33/755; 33/770; 70/30; 70/49
[58] Field of Search ................ 33/755, 756, 760, 761, 33/767, 769, 770, 771; 70/30, 49, 58, 18

[56] References Cited

U.S. PATENT DOCUMENTS

| 3,164,907 | 1/1965 | Quenot | 33/767 |
| 4,543,806 | 10/1985 | Papandrea et al. | 70/30 |
| 4,691,539 | 9/1987 | Gover | 70/49 X |

FOREIGN PATENT DOCUMENTS

| 0571855 | 5/1924 | France | 33/755 |
| 0115887 | 5/1899 | Germany | 70/49 |

OTHER PUBLICATIONS

Packaging from Stanley Duralock TM tape rule, © 1989. Stanley Tools.

*Primary Examiner*—Diego F. F. Gutierrez
*Assistant Examiner*—Alvin Wirthlin
*Attorney, Agent, or Firm*—Malloy & Malloy

[57] ABSTRACT

A locking and measuring device which includes a housing having a top wall, a bottom wall, a first spaced end wall and a second spaced end wall, with a first opening in the first spaced end wall, and a second opening in the top wall, an extendable length of substantially strong and durable, yet bendable material having a terminal end, the length of material being normally, retractably stored in the housing with the terminal end at all times exteriorly accessible of the first opening; the terminal end of the length of material includes a locking end zone to be inserted into the second opening wherein it is matingly received and releasably captivated until released; along the length of material graduated indicia are provided defining a measuring scale.

8 Claims, 1 Drawing Sheet

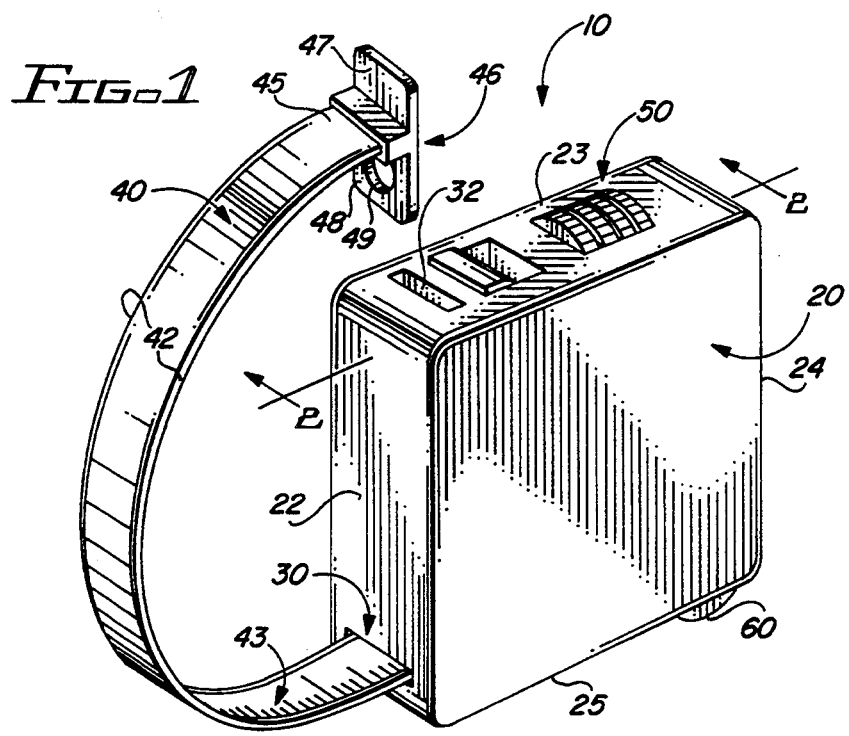
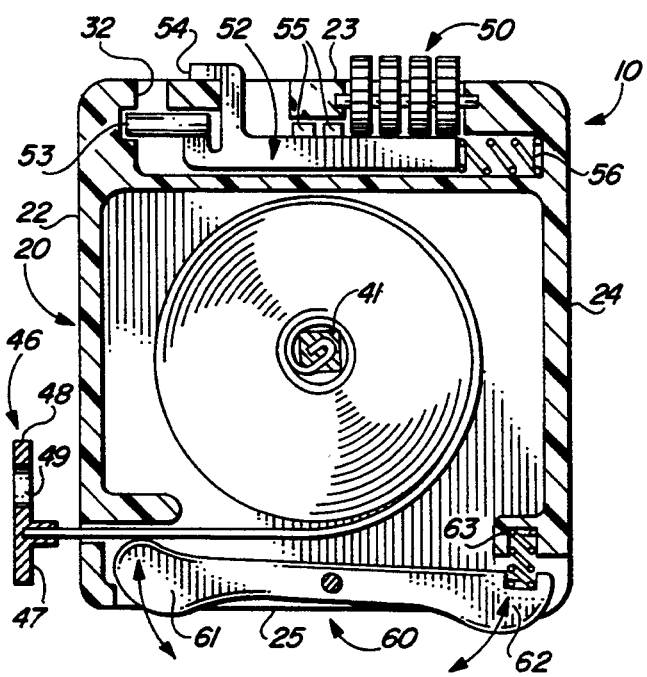
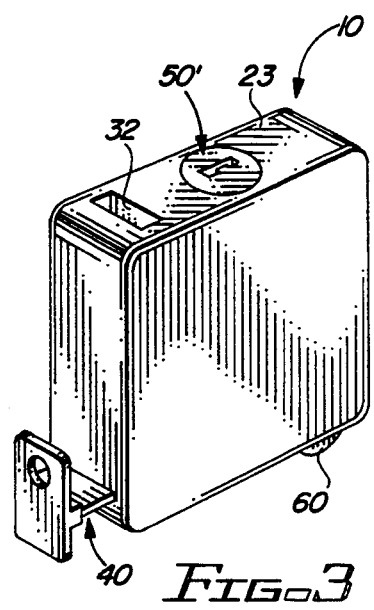

LOCKING AND MEASURING DEVICE

BACKGROUND OF THE INVENTION

FIELD OF THE INVENTION

This invention relates to a locking device which can alternatively be used as a measuring tape.

SUMMARY OF THE INVENTION

In the past, many people require a small measuring tape or, alternatively, a convenient lock. For example, bicyclists or skiers must often leave their items outside while they enter a store, cabin or rest room for a few minutes. This invention provides a hand held device which can be used to lock the skis or bicycle on such occasions. Further, when larger items must be secured, an ordinary lock cannot be used, but rather a large, often cumbersome chain must also be carried and utilized. Accordingly, it would be beneficial to provide a locking device which is easy and non-burdensome to carry, while providing effective locking of items of varying sizes.

Additionally, many individuals such as carpenters, decorators, and the like must often take various measurements that relate to their job, while also requiring that sample cases, briefcases, tool boxes and the like be held secured.

The device of the present invention includes a housing within which there is wound a strong, extendable length of material which bears indicia therealong so that it can serve as a measuring tape. The terminal end of the length of material, which extends from a first opening in the housing, includes a locking end zone which is adapted to be inserted into a companionate second opening in the housing where it engages lock means such that the device can also be utilized to lock up various items.

BRIEF DESCRIPTION OF THE DRAWINGS

For a fuller understanding of the nature of the present invention, reference should be had to the following detailed description taken in combination with the accompanying drawings in which:

FIG. 1 is a perspective view of the preferred embodiment of the device of the instant invention;

FIG. 2 is a cross-sectional view of the device of the present invention along line 2—2 of FIG. 1;

FIG. 3 is a perspective view of an alternative embodiment of the device of the instant invention;

Like reference numerals refer to like parts throughout the several views of the drawings.

DETAILED DESCRIPTION OF THE PREFERRED EMBODIMENTS

Shown in FIGS. 1-3, the present invention is directed towards a locking and measuring device, generally indicated as 10. The locking and measuring device 10 includes a housing 20 with a first spaced end wall 22, a top wall 23, a second space end wall 24 and a bottom wall 25. Specifically, the housing 20 can be formed of a strong plastic or metallic material and is substantially small and compact such that it can be easily carried or transported much like a standard tape measure casing. Positioned in the first spaced end wall 22 of the housing 20 is a first opening 30. This first opening 30 is positioned to provide access to an interior of the housing 20 and is adapted to provide slidable access to an extendable length of substantially strong and durable, yet bendable material 40 which functions like a measuring tape and is retractably disposed within the housing 20. Specifically, this length of material 40 includes an attachment end 41 and a terminal end 45 and is adapted to be sufficiently resilient such that the length of material 40 will be normally, retractably stored within the housing 20. The attachment end 41 is fixedly secured within the housing 20 and accordingly will always be maintained within the housing 20, thereby anchoring the length of material 40 so that it will normally retract into the housing 20. The terminal end 45 of the length of material 40 is adapted to protrude through the first opening 30 and be exteriorly accessible of the first opening 30 at all times. The length of material 40 includes reinforcing means to substantially increase the strength thereof and substantially resist tearing or cutting. Preferably, the reinforcing means includes a pair of spaced, elongate metal cables 42 which extend along each length of the length of material 40. Encasing the cables 42 is a durable, resilient material which jackets both cables 42 and spans the area therebetween along an entire length of the length of material 40. This jacketing material is preferably a plastic or rubber material which is bendable and resilient such that subsequent to being extended from the housing 20, the length of material 40 will normally and independently retract into the housing 20. Also included on the length of material 40 is graduating indicia 43 which comprises a measuring scale, thereby enabling the device to be utilized much like a conventional tape measure. Further, the jacketing material should be transparent so as to further facilitate measuring utilizing the graduated indicia 43.

Disposed on the terminal end 45 of the length of material 40 is a locking end zone 46. This locking end zone 46 is sized such that it cannot fit through the first opening 30 thereby ensuring that the terminal end 45 of the length of material 40 always remains exterior of the housing 20. This locking end zone is preferably of a generally T-shaped configuration such that it includes a measuring flap 47 and a locking flap 48 extending from opposite sides of the terminal end 45. The measuring flap 47 is configured much like a measuring flap on standard tape measures and is adapted to be laid over the edge of an item to be measured such that the terminal end 45 is slightly anchored during extension of the length of material 40 from the housing 20. Included in the top wall 23 of the housing 20 is a second opening 32. This second opening 32 is adapted to receive the locking flap 48 of the locking end zone 46 for locked engagement therein. Although any conventional type of locking mechanism could be utilized, in the preferred embodiment, the locking flap 48 includes an aperture 49 formed therein such that upon insertion into the second opening 32 lock means in the form of a lock pin 52 will engage the aperture 49 thereby locking and retaining the terminal end 45 secured to the housing 20. As illustrated in FIG. 2, the lock pin 52 is spring-biased within the housing 20 utilizing a spring 56 such that the lock pin 52 will normally be urged towards the first end wall 22 of the housing 20. Accordingly, when in its normal orientation, the tip 53 of the lock pin 52 is disposed through the aperture 49, which functions as a female latch, of the locking end zone 46, thereby preventing removal of the locking flap 48 of the locking end zone 46 from the second opening 32. The lock pin 52 is disengaged from within the aperture 49 of the locking flap 48 by retracting the lock pin 52 towards the spring 56 and second end wall 24. This retraction of the lock pin 52 is accomplished by pushing down on the latch lever 54 so as to slidably move the lock pin 52 towards the spring 56 and pulling out the point 53 of the lock pin 52 from its captivated orientation within the aperture 49 of the locking flap 48.

In order to ensure secure engagement of the lock pin with the locking end zone 46, lock release means are employed to allow only selective disengagement when desired by a user. In the preferred embodiment, the lock release means are in the form of one or a plurality of combination tumblers 50 which are positioned within the housing 20 so as to be rotatably exposed through the top wall 23 including the second opening 32 therein. The combination tumblers 50 function as conventional combination tumblers wherein a combination indicator face is exposed through the top wall 23, such that the tumblers 50 can be properly oriented relative to one another. Only when the tumblers 50 are properly oriented will a plurality of protrusions 55 disposed on the lock pin 52 be able to slidably pass through the combination tumblers 50 so as to allow movement of the lock pin 52. In an alternative embodiment, the lock release means can include a key actuated tumbler 50' wherein a key access aperture is exteriorly exposed through the housing 20 thereby enabling a key to be inserted. Turning of the key actuator tumbler 50' can also result in retraction of the lock pin 52 so as to disengage the locking end zone 46 on the length of material 40.

The device of the present invention may also include a spring actuated latch 60 which is adapted to maintain the length of material 40 in a desired extended position until retraction is desired. Specifically, the spring actuator latch 60 is pivotally secured to the housing 20 and includes an actuator end 62 and an engagement head 61. The engagement head 61 is adapted to pin the length of material 40 to an interior of the housing 20 thereby restricting the slidability of the elongate length of material 40 into or out of the housing 20. When in its normally relaxed position, the engagement head 61 of the spring actuator latch 60 is in pinning engagement with the length of material 40, this relaxed position being achieved by a small spring 63 which normally urges the actuator end 62 out from the housing 20. This actuator end 62 normally protrudes through the housing 20 and is accessible to be pushed by a user in order to disengage the engagement head 61. Further, this spring actuated latch 60 can include a locking mechanism such that the actuator end 62 can only be selectively pushed.

While this invention has been shown and described in what is considered to be a practical and preferred embodiment, it is recognized that departures may be made within the spirit and scope of this invention which should, therefore, not be limited except as set forth in the claims which follow and within the doctrine of equivalence.

What is claimed is:

1. A locking and measuring device comprising:
    a housing having a top wall and a bottom wall separated by a first spaced end wall and a second spaced end wall,
    a first opening disposed in said first spaced end wall,
    a second opening in said top wall,
    an extendable length of substantially strong and durable, yet bendable material retractably disposed within said housing, said length of material including an attachment end and a terminal end,
    said length being normally, retractably stored in said housing with said attachment end fixedly secured within said housing and said terminal end protruding through said first opening and being at all times exteriorly accessible of said first opening,
    said terminal end being of a T-shaped configuration and including a measuring flap and a locking end zone, said locking end zone being structured and disposed to be lockingly inserted into said second opening,
    a lock means disposed within said housing, said lock means being structured and disposed for matingly receiving and releasably captivating said locking end zone of said terminal end within said second opening,
    lock release means structured and disposed to selectively disengage said lock means from said locking end zone, and
    said length of material including graduated indicia therealong comprising a measuring scale.

2. A device as recited in claim 1 where in said length of material includes reinforcing means structured and disposed to substantially increase the strength thereof.

3. A device as recited in claim 2 wherein said reinforcing means includes at least one metal cable.

4. A device as recited in claim 3 wherein said at least one cable is jacketed within said durable, bendable material bearing said graduated indicia therealong.

5. A device as recited in claim 2 wherein said lock release means includes combination tumblers disposed in said housing such that a combination indicator face thereof is exteriorly visible from said housing.

6. A device as recited in claim 5 wherein said locking end zone includes a female latch extending substantially perpendicularly from said terminal end of said length of material.

7. A device as recited in claim 6 wherein said lock means includes an elongate lock pin slidably disposed within said housing so as to releasably engage said female latch.

8. A device as recited in claim 2 wherein said lock release means includes a key actuated tumbler disposed in said housing such that a key access aperture thereof is exteriorly exposed through said housing.

* * * * *